(12) United States Patent
Gouabau et al.

(10) Patent No.: US 11,954,548 B2
(45) Date of Patent: Apr. 9, 2024

(54) SMART CARD ENROLLMENT DEVICE

(71) Applicants: STMicroelectronics (Grand Ouest) SAS, Le Mans (FR); STMicroelectronics (Rousset) SAS, Rousset (FR)

(72) Inventors: Frederic Gouabau, Betton (FR); Olivier Rouy, Peynier (FR)

(73) Assignees: STMicroelectronics (Grand Ouest) SAS, Le Mans (FR); STMicroelectronics (Rousset) SAS, Rousset (FR)

( * ) Notice: Subject to any disclaimer, the term of this patent is extended or adjusted under 35 U.S.C. 154(b) by 238 days.

(21) Appl. No.: 17/520,266

(22) Filed: Nov. 5, 2021

(65) Prior Publication Data

US 2022/0147786 A1    May 12, 2022

(30) Foreign Application Priority Data

Nov. 12, 2020   (FR) ...................................... 2011618

(51) Int. Cl.
  *G06K 19/07*   (2006.01)
  *G06K 19/073*  (2006.01)
  *H05B 45/10*   (2020.01)
(52) U.S. Cl.
  CPC ....... *G06K 19/07354* (2013.01); *H05B 45/10* (2020.01)
(58) Field of Classification Search
  None
  See application file for complete search history.

(56) References Cited

U.S. PATENT DOCUMENTS

| 2019/0244210 | A1* | 8/2019  | Cheng   | G06K 19/07705 |
| 2020/0349408 | A1* | 11/2020 | Prawitz | G06K 19/042   |
| 2020/0356745 | A1* | 11/2020 | Yeh     | G06F 21/32    |
| 2021/0192529 | A1* | 6/2021  | Souchon | G06Q 20/4012  |

FOREIGN PATENT DOCUMENTS

| EP | 3608833 A1 | 7/2019  |
| EP | 3570239 A1 | 11/2019 |
| EP | 3734493 A1 | 11/2020 |

OTHER PUBLICATIONS

INPI Search Report and Written Opinion for FR Appl. No. 2011618 (which is the FR priority application for the instant US filing), dated Aug. 12, 2021 (9 pages).

* cited by examiner

*Primary Examiner* — Thien M Le
*Assistant Examiner* — April A Taylor
(74) *Attorney, Agent, or Firm* — Crowe & Dunlevy LLC

(57)   ABSTRACT

A connector that is configured to receive a smart card includes: a first contact configured to receive a power supply voltage and corresponding to a first (power supply) contact area of the smart card, a second contact configured to receive a reference voltage and corresponding to contact a second (reference voltage) contact area of the smart card, and a third contact corresponding to a three-state (input/output) contact area of the smart card. A first light-emitting diode having an anode coupled to the third contact and a cathode coupled to the second contact. A second light-emitting diode has a cathode coupled to the third contact and an anode coupled to the first contact. Turning on/off of the first and second light-emitting diode is controlled by the smart card through the signal at the three-state (input/output) contact area.

22 Claims, 2 Drawing Sheets

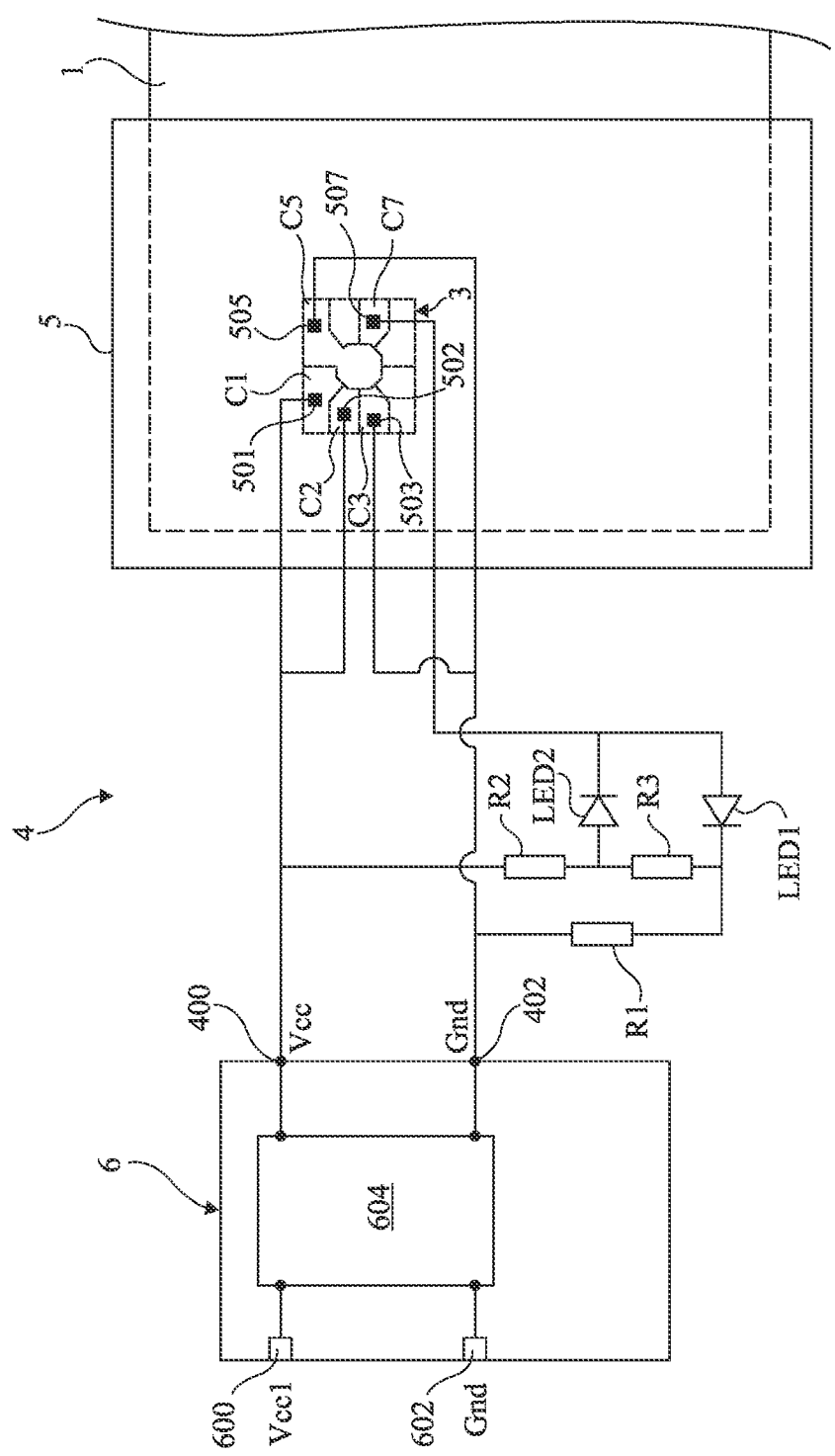

SMART CARD ENROLLMENT DEVICE

PRIORITY CLAIM

This application claims the priority benefit of French Application for Patent No. 2011618, filed on Nov. 12, 2020, the content of which is hereby incorporated by reference in its entirety to the maximum extent allowable by law.

TECHNICAL FIELD

The present disclosure generally concerns electronic devices and, more specifically, smart cards.

BACKGROUND

Many applications use smart cards, for example, payment cards, transport cards, personal identification cards, etc. Among current smart cards, cards equipped with a biometric sensor are particularly known. The biometric sensor typically supports performance of identity verifications, for example, for each use of the card.

For this purpose, a smart card equipped with a biometric sensor must undergo a step of enrollment of its legitimate user. The enrollment step comprises obtaining, through to the biometric sensor, biometric data of the legitimate user of the card, for example, data representative of a fingerprint of the user when the biometric sensor is a fingerprint sensor. These biometric data, called reference data, are recorded in the card so that, during a subsequent use of the card, for example, to enable a payment, after the card has acquired biometric data of a current user of the card, the acquired biometric data can be compared with the reference biometric data. If the acquired biometric data correspond to the reference biometric data, the current user of the card is identified as being the legitimate user of the card, that is, the enrolled user, and the current operation, for example, a payment is enabled as being valid. Conversely, if the acquired biometric data do not correspond to the reference biometric data, the current user of the card is identified as being a fraudulent user, and the current operation, for example, a payment is disabled as being invalid.

Devices configured to cooperate with a smart card comprising a biometric sensor are known. These known devices comprise a battery for supplying the card with power, for example, during the enrollment phase. Further, to guide the user, for example, during the enrollment phase, these devices may comprise light-emitting diodes (LED), controlled by the card. These devices may also comprise no light-emitting diodes, the latter then being provided on the card, which increases the complexity of the card and of its manufacturing.

There is a need to overcome all or part of the disadvantages of the above-described known devices.

For example, it would be desirable to provide a device configured to supply with power a smart card comprising a biometric sensor, which comprises no battery. It would for example also be desirable for such a device to comprise light-emitting diodes that can be controlled by the smart card, in particular during a card enrollment phase.

SUMMARY

Embodiments herein overcome all or part of the disadvantages of known devices configured to supply power to a smart card provided with a biometric sensor, for example, during a card enrollment phase.

An embodiment provides a device comprising: a first node configured to receive a power supply voltage; a second node configured to receive a reference voltage; a first connector configured to receive a smart card, the first connector comprising: a first electric contact connected to the first node and configured to come into contact with a first electric contact area of the card intended to receive the power supply voltage, a second electric contact connected to the second node and configured to come into contact with a second electric contact area of the card intended to receive the reference voltage, and a third electric contact configured to come into contact with a third electric contact area of the card corresponding to a three-state output; a first light-emitting diode having an anode coupled to the third contact and a cathode coupled to the second node; and a second light-emitting diode having a cathode coupled to the third contact and an anode coupled to the first node.

According to an embodiment, the device further comprises: a first resistor series-connected with the first diode between the second node and the third contact; and a second resistor series-connected with the second diode between the first node and the third contact.

According to an embodiment, the device further comprises a third resistor coupling the anode of the second diode to the cathode of the first diode.

According to an embodiment, the values of said resistors are determined so that: the first diode is on and the second diode is off when the three-state output is at the power supply voltage; the first diode is off and the second diode in on when the three-state output is at the reference voltage; and the first and second diodes are off when the three-state output is in a high-impedance state.

According to an embodiment, the three-state output is of general purpose input/output type, GPIO.

According to an embodiment, the first connector further comprises a fourth electric contact connected to the second node or to the first node and configured to come into contact with a fourth electric contact area of the card configured to receive a clock signal.

According to an embodiment, the first connector further comprises a fifth electric contact connected to the first node and configured to come into contact with a fifth electric contact area of the card configured to receive an initialization signal.

According to an embodiment, the device further comprises a second connector configured to cooperate with a power source and to deliver the power supply voltage to the first node and the reference voltage to the second node, the device comprising no battery.

According to an embodiment, the second connector is of universal serial bus type, USB.

According to an embodiment, the second connector comprises an interface circuit configured to receive an electric supply power when the second connector is coupled to a complementary connector of the power source, and to deliver the reference voltage and the power supply voltage based on an electric supply power delivered by the power source.

According to an embodiment, the card complies with the ISO/IEC 7816-1, ISO/IEC 7816-2, and ISO/IEC 7816-3 standards, the card preferably belonging to class A of the ISO/IEC 7816-3 standard.

According to an embodiment, the first contact area corresponds to contact C1 of the ISO/IEC 7816-2 and ISO/IEC 7816-3 standards, the second contact area corresponds to contact C5 of the ISO/IEC 7816-2 and ISO/IEC 7816-3 standards, and the third contact area corresponds to contact C7 of the ISO/IEC 7816-2 and ISO/IEC 7816-3 standards.

According to an embodiment, the power supply voltage, referenced to the reference voltage, is in the range from 4.75 V to 5.25 V.

According to an embodiment, the device comprises a package configured to allow the reception of the card by the first connector and to enable a user to see light emitted by the diodes, connections coupling the electric contacts and the first and second nodes together and to the diodes being arranged within the package.

An embodiment provides a method of using a device such as described, wherein: the first diode is turned on and the second diode is turned off by the application of the power supply voltage to the third contact; the first diode is turned off and the second diode is turned on by the application of the reference voltage to the third contact; and the first and second diodes are turned off by the application of a high-impedance state to the third contact.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 3 very schematically shows in top view another embodiment of a device configured to cooperate with a card of the type of that of FIG. 1.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the current uses of a smart card provided with a biometric sensor have not been detailed, the described embodiments being compatible with these current uses.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, unless indicated otherwise, first and second components are said to be series-connected between first and second nodes when a terminal of the first component is coupled, for example, connected, to the first node, another terminal of the first component is coupled, for example, connected, to a terminal of the second component, and the other terminal of the second component is coupled, for example, connected, to the second node, even if the current flowing through the first component is different from the current flowing through the second component.

Figure 1:
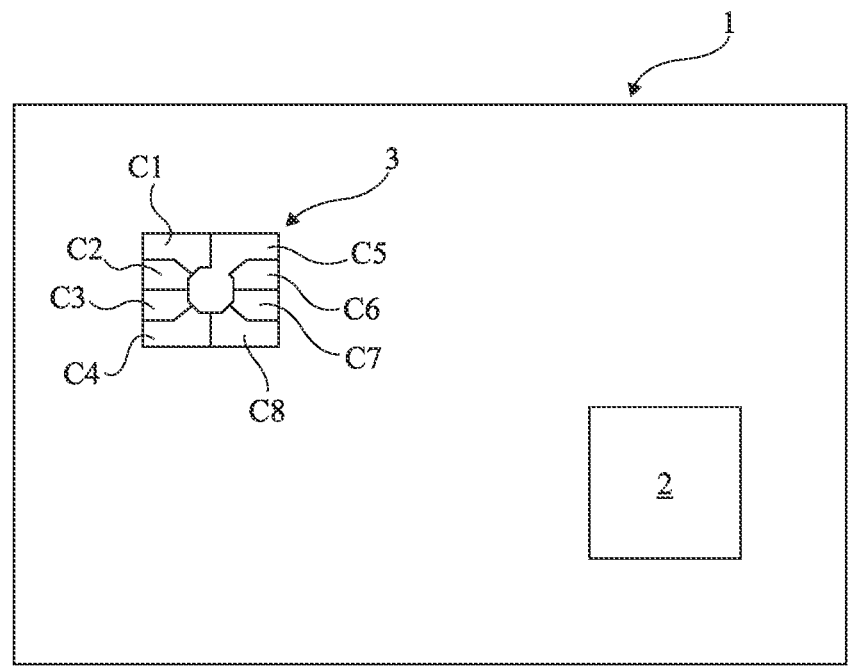
FIG. 1 very schematically shows in top view an example of a smart card provided with a biometric sensor, of the type to which the described embodiments apply.

FIG. 1 very schematically shows in top view an example of a smart card 1 provided with a biometric sensor 2, of the type to which the described embodiments apply.

Conventionally, card 1 has a substantially rectangular shape in top view. As an example, card 1 has, in top view, a width equal to 53.98 mm, which for example complies with the ISO/IEC 7816-1 standard. As an example, card 1 has a thickness (measured perpendicularly to the plane of FIG. 1) equal to 0.76 mm, which for example complies with the ISO/IEC 7816-1 standard.

Card 1 comprises an electric contact surface 3. Preferably, surface 3 has, in top view, a substantially rectangular shape. Preferably, in top view, the large sides of card 1 are parallel to the large sides of surface 3, the small sides of card 1 being parallel to the small sides of surface 3. As an example, surface 3 has, in top view, a width equal to 9.23 mm and a length equal to 9.62 mm, which for example complies with the ISO/IEC 7816-1 standard. As an example, surface 3 is arranged 9.07 mm away from a large side of card 1 (at the top in FIG. 1), and 10.25 mm away from a small side of card 1 (on the left-hand side in FIG. 1), which for example complies with the ISO/IEC 7816-1 standard.

Surface 3 comprises a plurality of electric contact areas, for example, eight contact areas C1, C2, C3, C4, C5, C6, C7, and C8. Areas C1, C2, C3, C4 are, for example, arranged in that order along a small side of surface 3, and areas C5, C6, C7, and C8 are arranged in that order along the other small side of card 1. As an example, area C1 is located in that of the corners of surface 3 which is closest to a corner of card 1 (the top left corner in FIG. 1).

In particular, contact area C1 is configured to receive a voltage for powering card 1, contact area C5 is configured to receive a reference voltage of card 1, typically the ground, and contact area C7 is configured to be used as a three-state output by card 1. In other words, card 1 is configured to selectively apply a high voltage to output C7, this high voltage being typically equal to the power supply voltage received on area C1, to apply a low voltage to output C7, this low voltage being typically equal to the reference voltage received on area C5, and to place output C7 in a high-impedance state or, in other words, to apply no voltage to output C7, which is then floating.

As an example, contact area C1 is configured to receive a power supply voltage, referenced to the reference voltage, which is in the range from 4.75 V to 5.25 V, which is compatible with class-A cards of the ISO/IEC 7816-3 standard.

As an example, contact area C7 corresponds to an input/output of card 1, of general purpose input/output, or GPIO, type.

As an example, contact areas C1, C5, and C7 correspond to the contact C1, C5, and C7 of the ISO/IEC 7816-2 and ISO/IEC 7816-3 standards.

As an example, contact area C3 is configured to receive a clock signal, contact area C3 for example corresponding to the contact C3 of the ISO/IEC 7816-2 and ISO/IEC 7816-3 standards.

As an example, contact area C2 is configured to receive an initialization signal, contact area C2 for example corresponding to the contact C2 of the ISO/IEC 7816-2 and ISO/IEC 7816-3 standards.

As an example, contact areas C4, C6, and C8 correspond to the contacts C4, C6, and C8 of the ISO/IEC 7816-2 and ISO/IEC 7816-3 standards.

Although FIG. 1 shows the case where surface 3 is arranged on the upper surface side of card 1, and is thus visible in top view, in other cards 1, this surface 3 is arranged on the side of a lower surface of card 1.

Biometric sensor 2 is preferably a fingerprint sensor. In the example of FIG. 1, sensor 2 is arranged on the side of the same surface of card 1 as electric contact surface 3, that is, the upper surface of card 1 in the example of FIG. 1. However, these two elements 2 and 3 may also both be arranged on the lower surface side of card 1, or may be respectively arranged on two different surfaces of card 1.

As an example, card 1 comprises no light-emitting diode and is thus not capable of displaying by itself information, or light signals, for a user, for example, during an enrollment phase.

Figure 2:
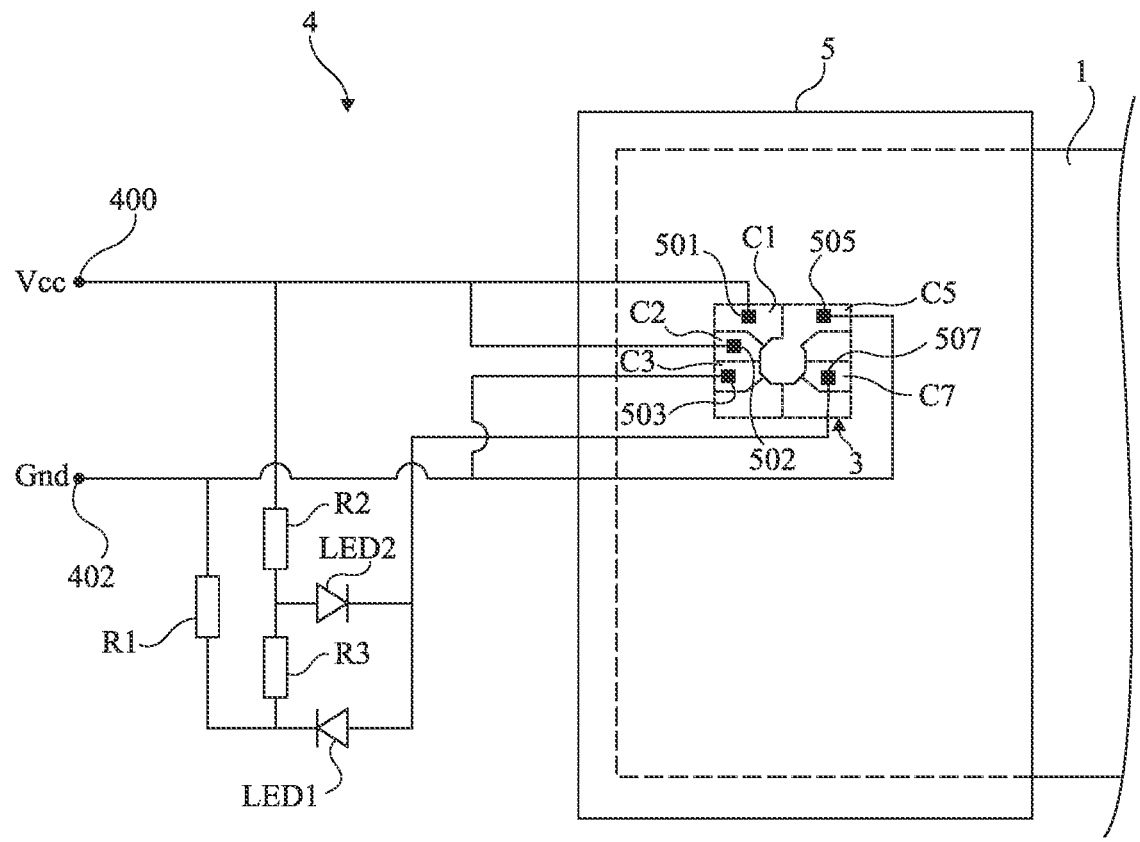
FIG. 2 very schematically shows in top view an embodiment of a device configured to cooperate with a card of the type of that of FIG. 1.

FIG. 2 very schematically shows in top view an embodiment of a device 4 configured to cooperate with a card of the type of that in FIG. 1, for example, with the card 1 of FIG. 1 as shown in FIG. 2.

Device 4 comprises two nodes 400 and 402. Node 400 is configured to receive a power supply voltage Vcc. Node 402 is configured to receive a reference voltage Gnd. Voltage Vcc is referenced to the potential of node 402.

Device 4 further comprises a connector 5, here shown in the form of a block. Connector 5 is configured to receive card 1 or, in other words, to cooperate with card 1. For example, connector 5 is configured so that card 1 can be at least partially inserted into connector 5, for example, so that the electric contact surface 3 of card 1 is located inside of connector 5 when card 1 is inserted in connector 5 and, preferably, so that sensor 2 remains located outside of connector 5 to remain accessible to a user.

Connector 5 comprises electric contacts configured to come into contact with corresponding electric contact areas of surface 3 of card 1, when card 1 is arranged, for example, inserted, in connector 5. In FIG. 2, the portion of card 1 inserted in connector 5, the contact surface 3 of card 1, and the contact areas defined in surface 3 are shown in dotted lines.

More particularly, connector 5 comprises a contact 501 configured to come into contact with the contact area C1 of card 1, a contact 505 configured to come into contact with the contact area C5 of card 1, and a contact 507 configured to come into contact with the contact area C7 of card 1, when card 1 is inserted into connector 5.

Device 4 further comprises a light-emitting diode LED1 and a light-emitting diode LED2. Diode LED1 has its anode coupled, for example, connected, to the contact 507 of connector 5, and its cathode coupled, for example, connected, to node 402. Diode LED2 has its cathode coupled, for example connected, to contact 507, and its anode coupled, for example, connected, to node 400.

According to an embodiment, one of diodes LED1 and LED2, for example, diode LED1, is configured to emit red light, and the other one of diodes LED1 and LED2, for example, diode LED2, is configured to emit green light.

Preferably, device 4 comprises no battery. Device 4 is then configured to be coupled to an electric power source, so that voltages Vcc and Gnd are delivered to respective nodes 400 and 402 from the power source having device 4 coupled thereto.

In device 4, node 400 is coupled, preferably connected, to contact 501, node 402 being coupled, preferably connected, to contact 505. Thus, when voltage Vcc is present on node 400 and reference voltage Gnd is present on node 402, card 1 receives these voltages Vcc and Gnd on its respective contact areas C1 and C5. As a result, card 1 is powered by device 4, and more particularly with voltage Vcc.

Further, in device 4, when card 1 is powered with voltage Vcc, card 1 is capable of controlling diodes LED1 and LED2, and, more particularly, card 1 is capable of controlling diodes LED1 and LED2 by means of its output C7. Indeed, the threshold voltages of diodes LED1 and LED2 are in practice lower than power supply voltage Vcc, whereby: when reference voltage Gnd is applied by card 1 to its output C7, diode LED2 emits light and diode LED1 is off; when power supply voltage Vcc is applied by card 1 on its output C7, diode LED2 is off and diode LED1 emits light; and when card 1 sets its output C7 to a high-impedance state, both diodes LED1 and LED2 are off.

According to an embodiment, a resistor R1 is series-connected with diode LED1 between node 402 and contact 507 and a resistor R2 is series-connected with diode LED2 between node 400 and contact 507. Resistor R1 enables to limit the current flowing through diode LED1 when it emits light, resistor R2 enabling to limit the current flowing through diode LED2 when it emits light.

For example, the cathode of diode LED1 is coupled to node 402 by resistor R1, a first terminal of resistor R1 being, for example, connected to the cathode of diode LED1 and a second terminal of resistor R1 being, for example, connected to node 402.

For example, the anode of diode LED2 is coupled to node 400 by resistor R2, a first terminal of resistor R2 being, for example, connected to the anode of diode LED2 and a second terminal of resistor R2 being, for example, connected to node 400.

According to an embodiment, a resistor R3 is connected between the cathode of diode LED1 and the anode of diode LED2. For example, a terminal of resistor R3 is connected to the cathode of diode LED1, the other terminal of resistor R3 being connected to the anode of diode LED2. Resistor R3 enables to avoid for the two diodes LED1 and LED2 to simultaneously turn on when contact area C7 is in a high impedance state.

According to an embodiment, card 1 implements an enrollment phase when it receives voltage Vcc on contact area C1, voltage Gnd on contact area C5, reference voltage Gnd or voltage Vcc on contact area C3, and voltage Vcc on area C2. In this case, connector 5 further comprises a contact 503 configured to come into contact with contact area C3 and a contact 502 configured to come into contact with contact area C2 when card 1 is received by connector 5. Node 402 or node 400 is then connected to contact 503, so that voltage Gnd or Vcc is applied to contact area 503. In the example of FIG. 2, contact 503 is connected to node 402. Further, node 400 is then connected to contact 502, so that voltage Vcc is applied to contact area C2. It is then sufficient to insert card 1 into the connector 5 of device 4 to trigger the implementation of a phase of enrollment by card 1.

As an example, in device 4: diode LED1 is configured to emit red light and its threshold voltage is equal to 1.8 V; diode LED2 is configured to emit green light and its threshold voltage is equal to 1.9 V; resistor R1 has a value equal to 180 Ohms; resistor R2 has a value equal to 220 Ohms; and resistor R3 has a value equal to 220 Ohms.

However, device 4 is not limited to the examples of values given hereabove, and it is within the abilities of those skilled in the art to determine the value of the resistors so that only diode LED1 is on when voltage Vcc is present on area C7, only diode LED2 is on when voltage Gnd is present on area C7, and both diodes LED1 and LED2 are off when a high-impedance state is present on area C7. For example, the value of the resistors may depend on the value of voltage Vcc, of the turn-on thresholds of diodes LED1 and LED2, and on the luminosity desired for each of diodes LED1 and LED2.

Although this is not shown, according to an embodiment, device 4 comprises a package. The package is configured to allow the reception of the card by connector 5 and to enable a user to see light emitted by diodes LED1 and LED2. Further, all the connections between electric contacts 501, 505, 507, and possibly 502 and/or 503, the possible resistors R1, R2, and R3, diodes LED1 and LED2, and nodes 400 and 402 are arranged within the package. Further, the possible resistors R1, R2, and R3 are arranged in the package, as well as nodes 400 and 402.

As an example, the connection terminals of diodes LED1 and LED2 are arranged in the package and a portion of diodes LED1 and LED2 is arranged outside of the package, so that the light emitted by diodes LED1 and LED2 is visible by a user. According to another example, diodes LED1 and LED2 are entirely arranged in the package, and the portion of the package which is arranged opposite diodes LED1 and LED2 is transparent to the light emitted by diodes LED1 and LED2, so that the light emitted by diodes LED1 and LED2 is visible by a user.

As an example, connector 5 is entirely arranged in the package, the latter comprising a slot through which card 1 may be inserted into connector 5. According to another example, a portion of connector 5 emerges out of package 5 and comprises a passage to insert card 1 into connector 5.

The implementation of such a package is within the abilities of those skilled in the art.

FIG. 3 very schematically shows in top view another embodiment of device 4.

More exactly, the device 4 of FIG. 3 comprises many elements in common with the device 4 of FIG. 2, which will not be described again, and all that has been indicated for the device 4 described in relation with FIG. 2 applies to the device 4 of FIG. 3.

The device 4 of FIG. 3 however differs from that of FIG. 2 in that it further comprises a connector 6.

Connector 6 is configured to cooperate with a power source (not shown in FIG. 3), that is, to be connected to a power source. Thus, connector 6 receives a power supply voltage from the power source. As an example, connector 6 comprises at least two terminals or electric contacts 600 and 602, contact 600 being configured to receive a power supply voltage Vcc1 from the power source and contact 602 being configured to receive a reference voltage, for example, voltage Gnd, from the power source.

Connector 6 is configured to deliver power supply voltage Vcc to node 400 and voltage Gnd to node 402, based on the voltages Vcc1 and Gnd delivered by the power source having connector 6 coupled thereto. Device 4 preferably comprises no battery. As an example, connector 6 is coupled, for example, connected, to nodes 400 and 402.

According to an embodiment, connector 6 is a connector of universal serial bus or USB type, for example, a male connector. In this case, the terminals 600 and 602 of connector 6 are intended to cooperate with corresponding terminals of a USB-type connector complementary to connector 6, for example, a female connector. Further, although this is not shown, connector 6 may then comprise other terminals or contacts intended to cooperate with corresponding terminals or contacts of the USB connector complementary to connector 6.

An advantage of providing USB-type connector 6 is that a very large number of devices may then be used as a power source, for example, computers, particularly laptop computers, cell phones embarking a USB function, USB charge batteries, USB chargers, etc.

According to an embodiment, in particular when connector 6 is a USB connector, connector 6 comprises an interface circuit 604. Interface circuit 604 is configured to receive the electric supply power delivered by the power source having connector 6 coupled thereto, and to deliver, based on this supply power, voltages Vcc and Gnd to respective nodes 400 and 402. As an example, circuit 604 is coupled, for example, connected, to the contacts 600 and 602 of connector 6, and to nodes 400 and 402. As an example, when voltage Vcc1 is greater than the power supply voltage Vcc of card 1, circuit 604 is configured to generate voltage Vcc at a value adapted to card 1, based on voltage Vcc1, circuit 604 then comprising, for example, a DC/DC voltage converter.

According to an embodiment where device 4 comprises a package, connector 6 is at least partly arranged inside of the package, and the package is configured to allow the coupling of connector 6 with a connector complementary to a power source. For example, connector 6 is a male connector comprising a portion provided with contacts 600 and 602 which is arranged outside of the package, and a portion, for example, comprising circuit 604, which is arranged inside of the package.

Various embodiments and variants have been described. Those skilled in the art will understand that certain features of these various embodiments and variants may be combined, and other variants will occur to those skilled in the art. In particular, although device 4 has been described in the case where it is configured to cooperate with card 1, particularly when card 1 complies with the ISO/IEC 7816-1, 7816-2, and 7816-3 standards, device 4 may be adapted by those skilled in the art to smart cards provided with a biometric sensor which are different from card 1, for example, which comprise LEDs and/or which do not comply with the above-mentioned standards. Further, device 4, which enables to power a smart card and to send, under control of the card, light information to a user, may be used during other operating phases than an enrollment phase, for example, to indicate, when card 1 is inserted in device 4, whether a finger present on sensor 2 corresponds to the fingerprint recorded in card 1 during a previous enrollment phase. Device 4 may further be used with a smart card similar to card 1 but comprising no sensor 2.

Finally, the practical implementation of the described embodiments and variations is within the abilities of those skilled in the art based on the functional indications given hereabove. In particular, the programming of the smart card, particularly so that it drives diodes LED1 and LED2 when it is connected to device 4, is within the abilities of those skilled in the art, for example, by consulting the technical specifications and/or the user manual of the card.

The invention claimed is:

1. A device, comprising:
a first node configured to receive a power supply voltage;
a second node configured to receive a reference voltage;

a first connector configured to receive a smart card, the first connector comprising:
 a first electric contact connected to the first node and configured to come into contact with a first electric contact area of the smart card which is intended to receive the power supply voltage;
 a second electric contact connected to the second node and configured to come into contact with a second electric contact area of the smart card which is intended to receive the reference voltage; and
 a third electric contact configured to come into contact with a third electric contact area of the smart card which is a three-state output;
a first light-emitting diode having an anode coupled to the third electric contact and a cathode coupled to the second node; and
a second light-emitting diode having a cathode coupled to the third electric contact and an anode coupled to the first node;
wherein the first light-emitting diode is on and the second light-emitting diode is off when the three-state output is at the power supply voltage;
wherein the first light-emitting diode is off and the second light-emitting diode is on when the three-state output is at the reference voltage; and
wherein the first and second light-emitting diodes are both off when the three-state output is in a high-impedance state.

2. The device according to claim 1, further comprising:
 a first resistor series-connected with the first light-emitting diode between the second node and the third electric contact; and
 a second resistor series-connected with the second light-emitting diode between the first node and the third electric contact.

3. The device according to claim 2, further comprising a third resistor coupling the anode of the second light-emitting diode to the cathode of the first light-emitting diode.

4. The device according to claim 2, wherein resistance values of said first and second resistors control on and off states of the first and second light-emitting diodes dependent on a state of said three-state output.

5. The device according to claim 1, wherein the three-state output is a general purpose input/output (GPIO).

6. The device according to claim 1, wherein the first connector further comprises a fourth electric contact connected to one of the second node or the first node and configured to come into contact with a fourth electric contact area of the smart card which is intended to receive a clock signal.

7. The device according to claim 6, wherein the first connector further comprises a fifth electric contact connected to the first node and configured to come into contact with a fifth electric contact area of the smart card intended to receive an initialization signal.

8. The device according to claim 1, further comprising a second connector configured to cooperate with a power source and to deliver the power supply voltage to the first node and the reference voltage to the second node.

9. The device according to claim 8, wherein the second connector is a universal serial bus (USB) connector.

10. The device according to claim 9, wherein the second connector comprises an interface circuit configured to receive an electric supply power when the second connector is coupled to a complementary connector of the power source, and to deliver the reference voltage and the power supply voltage based on an electric supply power delivered by the power source.

11. The device according to claim 1, wherein the smart card complies with the ISO/IEC 7816-1, ISO/IEC 7816-2, and ISO/IEC 7816-3 standards.

12. The device according to claim 11, wherein the smart card belongs to class A of the ISO/IEC 7816-3 standard.

13. The device according to claim 11, wherein the first contact area corresponds to contact C1 of the ISO/IEC 7816-2 and ISO/IEC 7816-3 standards, the second contact area corresponds to contact C5 of the ISO/IEC 7816-2 and ISO/IEC 7816-3 standards, and the third contact area corresponds to contact C7 of the ISO/IEC 7816-2 and ISO/IEC 7816-3 standards.

14. The device according to claim 1, wherein the power supply voltage, referenced to the reference voltage, is in a range from 4.75 V to 5.25 V.

15. The device according to claim 1, comprising a package configured to allow the reception of the smart card by the first connector and to enable a user to see light emitted by the first and second light-emitting diodes, connections coupling the electric contacts and the first and second nodes together and to the first and second light-emitting diodes being arranged within the package.

16. The device according to claim 1, wherein the first light-emitting diode is turned on and the second light-emitting diode is turned off by a state of said three-state output in response to said application of the power supply voltage to the third electric contact.

17. The device according to claim 1, wherein the first light-emitting diode is turned off and the second light-emitting diode is turned on by a state of said three-state output in response to said application of the reference voltage to the third contact.

18. The device according to claim 1, wherein the first and second light-emitting diodes are turned off by a state of said three-state output in response to said application of a high-impedance state to the third contact.

19. A method, comprising:
 receiving a smart card in a connector that includes:
  a first electric contact configured to come into contact with a first electric contact area of the smart card which is intended to receive a power supply voltage;
  a second electric contact configured to come into contact with a second electric contact area of the smart card which is intended to receive a reference voltage; and
  a third electric contact configured to come into contact with a third electric contact area of the smart card which is a three-state output; and
 selectively driving the three-state output to:
  the power supply voltage in order to turn on a first light-emitting diode coupled to the three-state output and turn off a second light-emitting diode coupled to the three-state output;
  the reference voltage in order to turn off the first light-emitting diode coupled to the three-state output and turn on the second light-emitting diode coupled to the three-state output; and
  a high-impedance state in order to turn off the first light-emitting diode and the second light-emitting diode.

20. The method according to claim 19, wherein the first light-emitting diode is turned on and the second light-emitting diode is turned off by a state of said three-state output in response to said application of the power supply voltage to the third electric contact.

21. The method according to claim 19, wherein the first light-emitting diode is turned off and the second light-emitting diode is turned on by a state of said three-state output in response to said application of the reference voltage to the third contact.

22. The method according to claim 19, wherein the first and second light-emitting diodes are turned off by a state of said three-state output in response to said application of a high-impedance state to the third contact.

* * * * *